US012332593B2

(12) United States Patent
Uezono et al.

(10) Patent No.: US 12,332,593 B2
(45) Date of Patent: Jun. 17, 2025

(54) FIXING UNIT AND IMAGE FORMING APPARATUS

(71) Applicant: Canon Kabushiki Kaisha, Tokyo (JP)

(72) Inventors: Takaomi Uezono, Shizuoka (JP); Minoru Hayasaki, Shizuoka (JP); Takaaki Tsuruya, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/468,905

(22) Filed: Sep. 18, 2023

(65) Prior Publication Data

US 2024/0094667 A1 Mar. 21, 2024

(30) Foreign Application Priority Data

Sep. 21, 2022 (JP) ................................ 2022-150320

(51) Int. Cl.
*G03G 15/20* (2006.01)

(52) U.S. Cl.
CPC ..... *G03G 15/2057* (2013.01); *G03G 15/2042* (2013.01); *G03G 15/206* (2013.01)

(58) Field of Classification Search
CPC ....... G03G 15/2053; G03G 2215/2035; G03G 15/2042; G03G 15/206; G03G 15/2057
See application file for complete search history.

(56) References Cited

U.S. PATENT DOCUMENTS

| | | | | |
|---|---|---|---|---|
| 2004/0037597 A1* | 2/2004 | Haseba | G03G 15/2053 | 399/328 |
| 2007/0059004 A1* | 3/2007 | Kang | G03G 15/2042 | 399/45 |
| 2015/0168895 A1* | 6/2015 | Nishizawa | G03G 15/206 | 399/330 |
| 2016/0313683 A1* | 10/2016 | Nishizawa | G03G 15/2042 | |
| 2021/0232071 A1* | 7/2021 | Saeki | G03G 15/2053 | |
| 2021/0232073 A1* | 7/2021 | Tsuruya | G03G 15/55 | |

FOREIGN PATENT DOCUMENTS

| | | |
|---|---|---|
| JP | 2004-288437 A | 10/2004 |
| JP | 2005-166524 A | 6/2005 |
| JP | 2017-009710 A | 1/2017 |
| JP | 2020-038351 A | 3/2020 |

OTHER PUBLICATIONS

H.B. Dwight, “Proximity Effect in Wires and Thin Tubes,” Journal of the AIEE, vol. XLII, No. 9, Sep. 1923, pp. 961-970.

* cited by examiner

*Primary Examiner* — Jessica L Eley
(74) *Attorney, Agent, or Firm* — Venable LLP

(57) ABSTRACT

A fixing unit includes a rotary member that includes a conductive layer, a magnetic core inserted in an interior space of the rotary member, and an energizing coil that includes a conductor and that is wound helically around a circumference of the magnetic core. In a case where a distance between a first cross section of the conductor in a plane along the longitudinal direction and a second cross section of the conductor in the plane and adjacent to the first cross section in the longitudinal direction is L1 (mm), and a distance between the conductor and the magnetic core in a radial direction orthogonal to the helical axis is L2 (mm), following inequalities are satisfied, $L1>0.1$ and $0.1<L2<2.0$.

15 Claims, 13 Drawing Sheets

FIXING UNIT AND IMAGE FORMING APPARATUS

BACKGROUND OF THE INVENTION

Field of the Invention

The present invention relates to a fixing unit for fixing an image on a recording material, and an image forming apparatus for forming an image on a recording material.

Description of the Related Art

In image forming apparatuses adopting an electrophotographic system, a fixing unit, i.e., image heating apparatus, for heating a developer image, or toner image, transferred to a recording material and fixing the image on the recording material is used. One known example of a heating system for heating the fixing unit is an induction heating system in which an alternating magnetic field generated by an energizing coil directly heats a rotary member including a conductor layer, i.e., heat generating layer. Japanese Patent Application Laid-Open Publication No. 2020-38351 discloses a configuration in which a PPS resin layer is formed on a circumference of a magnetic core, and in which an energizing coil is wound around the resin layer in a manner penetrating the resin layer.

However, the energizing coil disclosed in the above-mentioned document does not teach a specific distance between conductors of the energizing coil or a specific distance between a conductor of the energizing coil and the magnetic core. Therefore, a resistance of the energizing coil may be increased due to a proximity effect, and a heating value generated when current is supplied to the energizing coil may be increased. When the energizing coil is self-heated by electric conduction, the magnetic core may be heated, and influences such as magnetic saturation may tend to occur.

SUMMARY OF THE INVENTION

According to one aspect of the invention, a fixing unit includes a rotary member that includes a conductive layer and that is formed in a tubular shape extending in a longitudinal direction, a magnetic core inserted in an interior space of the rotary member, and an energizing coil that includes a conductor and that is wound helically around a circumference of the magnetic core such that a helical axis of the energizing coil is oriented in the longitudinal direction, the energizing coil being configured to generate an alternating magnetic field that induces a current in the conductive layer in a case where an alternating current is passed through the conductor, and wherein, in a case where a distance between a first cross section of the conductor in a plane along the longitudinal direction and a second cross section of the conductor in the plane and adjacent to the first cross section in the longitudinal direction is L1 (mm), and a distance between the conductor and the magnetic core in a radial direction orthogonal to the helical axis is L2 (mm), following inequalities are satisfied, $L1>0.1$ and $0.1<L2<2.0$.

Further features of the present invention will become apparent from the following description of exemplary embodiments with reference to the attached drawings.

DESCRIPTION OF THE EMBODIMENTS

Embodiments according to the present disclosure will be described below with reference to the drawings.

First Embodiment

Figure 1:
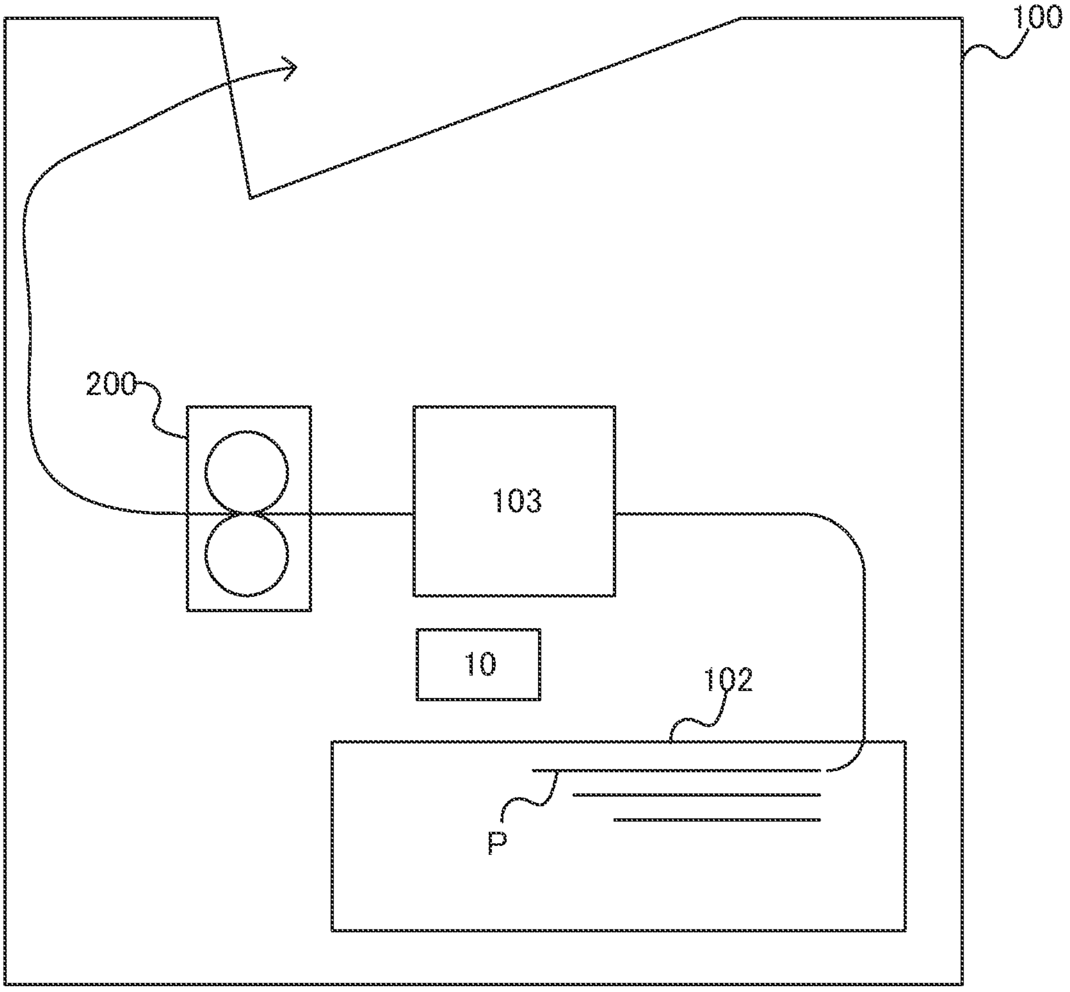
FIG. 1 is a schematic drawing of an image forming apparatus according to a first embodiment.

FIG. 1 is a schematic drawing of an image forming apparatus 100 according to a first embodiment. The image forming apparatus 100 is a laser beam printer that forms an image on a recording material P based on an image information received from an exterior. Various types of sheet materials of various sizes and materials can be used as the recording material P, such as paper including normal paper and thick paper, plastic films, cloths, sheet materials subjected to surface treatment such as coated paper, and special sheet materials such as envelopes and index paper.

The image forming apparatus 100 is equipped with a feeding unit 102, an image forming unit 103, a fixing unit 200, and a control circuit 10. The image forming unit 103 is a direct-transfer electrophotographic unit, for example. The electrophotographic unit includes a photosensitive drum serving as an image bearing member, and processing units that act on the image bearing member. Examples of the processing units are a charging unit, an exposing unit, a developing unit, a cleaning unit, and an exposing unit.

In the image forming operation, the feeding unit 102 feeds the recording materials P being stored in a stacked manner in the recording material storage portion one sheet at a time. In the image forming unit 103, the charging unit charges a surface of the photosensitive drum, and the exposing unit irradiates the surface of the photosensitive drum with a laser light based on an image information, by which an electrostatic latent image is formed on the surface of the photosensitive drum. The developing unit uses toner, or developer, to develop the electrostatic latent image into a toner image, i.e., developer image. A transfer unit transfers the toner image formed on the photosensitive drum to the recording material P fed from the feeding unit 102. Thereby, an image serving as an unfixed toner image is formed on the recording material P.

The recording material P having passed through the image forming unit 103 is conveyed to the fixing unit 200. The fixing unit 200 heats the image on the recording material P while conveying the recording material P, to thereby fix the image on the recording material P. The details of the fixing unit 200 will be described later. The recording material P having passed through the fixing unit 200 is discharged to an exterior of the apparatus as a product.

The series of image forming operations described above are controlled by the control circuit 10 serving as a control unit. The control circuit 10 includes a processor, i.e., CPU, that executes a program, and a memory that serves as a non-transitory storage medium storing the program.

The above-described image forming unit 103 is merely an example, and for example, an intermediate-transfer electrophotographic unit may also be used. In that case, the toner image formed on the image bearing member is primarily transferred to an intermediate transfer body, such as an intermediate transfer belt, and then secondarily transferred from the intermediate transfer body to the recording material P. Further, the image forming unit 103 can use multiple color toners to form color images.

Fixing Unit

Next, the fixing unit 200 adopting an induction heating system according to the present embodiment will be described with reference to FIGS. 2 and 3.

Figure 2:
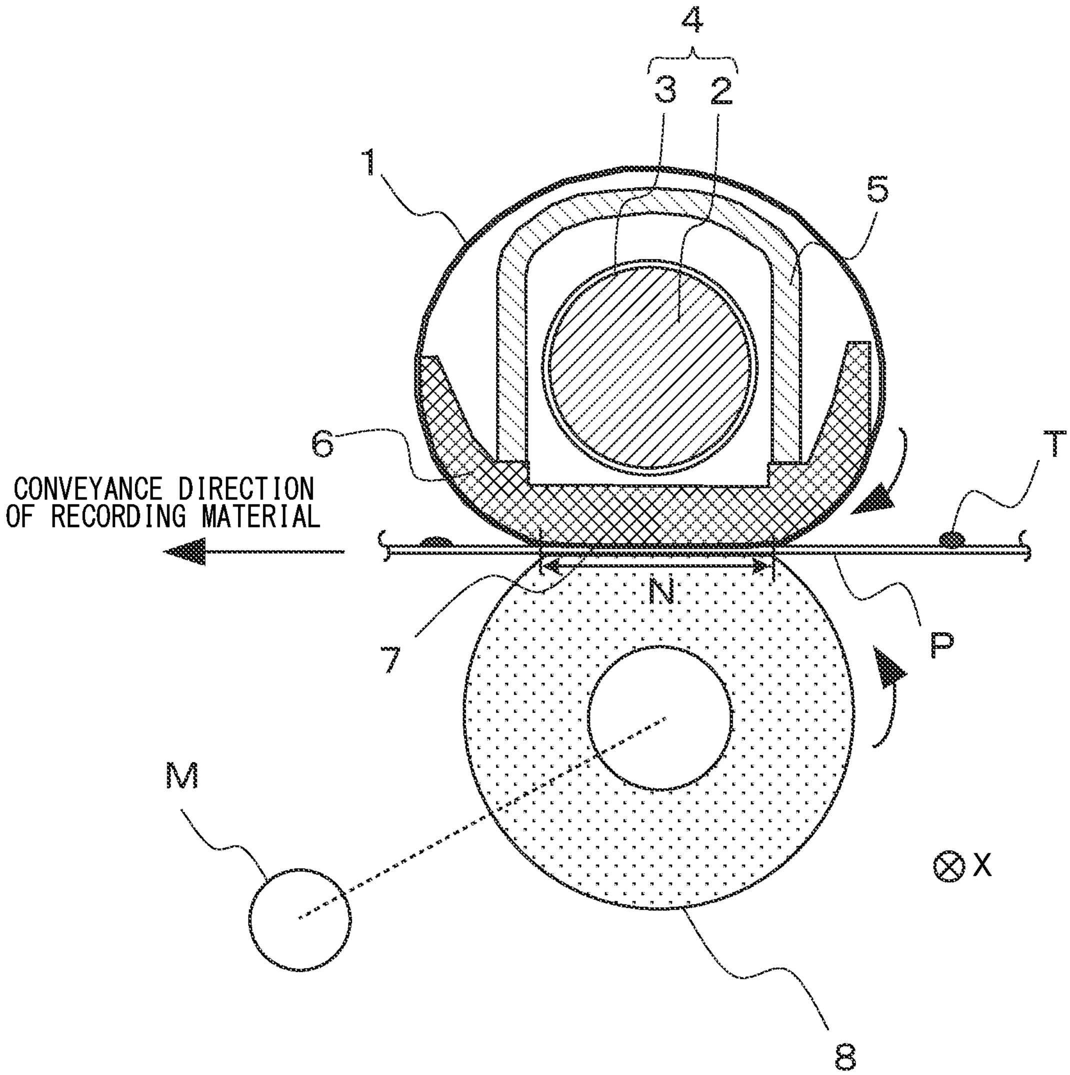
FIG. 2 is a cross-sectional view of a fixing unit according to the first embodiment.

FIG. 2 is a cross-sectional view of the fixing unit 200. The fixing unit 200 includes a fixing film 1, a guide member 6, a stay 5, a magnetic field generator 4, and a pressing roller 8.

In the following description, a generating line direction of the fixing film 1, that is, a longitudinal direction or rotational axis direction of the fixing film 1 and the pressing roller 8, is referred to as a longitudinal direction X of the fixing unit 200, or simply referred to as the longitudinal direction X. The longitudinal direction X is a direction orthogonal to a conveyance direction of the recording direction at a fixing nip N.

The fixing film 1 is a tubular fixing member (tubular film) serving as a heating rotary member. The fixing film 1 is an endless film member formed of a film material having a heat-resisting property and flexibility. The fixing film 1 includes a conductive layer having electrical conductivity as a heat generating layer.

The magnetic field generator 4 is a magnetic field generating unit that generates an alternating magnetic field for causing a heat generating layer of the fixing film 1 to generate heat. The magnetic field generator 4 includes a magnetic core 2 and an energizing coil 3, and is inserted to an interior space of the fixing film 1. The details of the magnetic field generator 4 will be described later.

The guide member 6 is arranged in the interior space of the fixing film 1, and is arranged to abut against the pressing roller 8 interposing the fixing film 1. The guide member 6 guides a rotation track of the fixing film 1. The guide member 6 is composed of a resin material having a heat-resisting property, and it is formed of a polyphenylene sulfide (PPS) resin, for example. A nip forming member 7, i.e., a slide member or nip pressing plate, that determines the shape of the fixing nip N is disposed on a sliding surface of the guide member 6 with the fixing film 1, i.e., lower side in the drawing.

The stay 5 is a structural member that supports the guide member 6 and that provides stiffness to a heating unit, i.e., film assembly, including the fixing film 1, the guide member 6, and the magnetic field generator 4. Because the stay 5 is urged by an urging member, i.e., pressure springs **17*a* and 17*b* described later, the guide member 6 comes in pressure contact with the pressing roller 8 while sandwiching the fixing film 1 together with the pressing member. Thereby, the fixing nip N (nip portion) having a predetermined width is formed between the nip forming member 7 and the pressing roller 8**.

The pressing roller 8 is an example of a pressing member. The pressing roller 8 is driven to rotate in a counterclockwise direction by a drive source M provided in the image forming apparatus 100.

Figure 3:
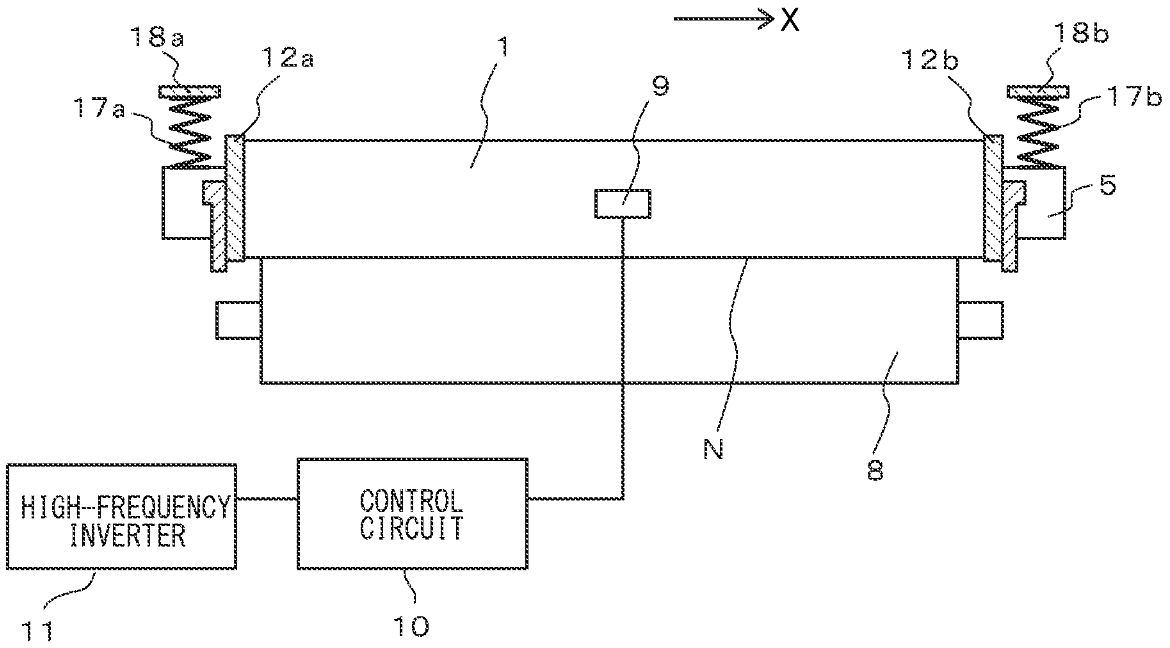
FIG. 3 is a side view of the fixing unit according to the first embodiment.

FIG. 3 is a side view of the fixing unit 200. Both end portions in a longitudinal direction of the stay 5 protrude outward of the fixing film 1. The pressure springs **17*a* and 17*b* are respectively connected to first and second end portions of the stay 5 and spring receiving portions 18*a* and 18*b* fixed to the frame body of the fixing unit 200, and urge the stay 5 toward the pressing roller 8. Thereby, the nip forming member 7 is pressed against the pressing roller 8 via the fixing film 1**, and a pressing force is generated at the fixing nip N.

Further, flanges **12*a* and 12*b* are arranged at first and second end portions in the longitudinal direction of the fixing unit 200, respectively. The flanges 12*a* and 12*b* include a supporting surface that supports an inner surface at longitudinal ends of the fixing film 1, and a flange portion that faces the longitudinal ends of the fixing film 1, and regulate a rotation track and a longitudinal position of the fixing film 1**.

Further, the fixing unit 200 includes a temperature detection element 9 such as a thermistor as a temperature detection unit that detects a surface temperature of the fixing film 1. The temperature detection element 9 outputs a signal corresponding to the surface temperature of the fixing film 1. The signal of the temperature detection element 9 is entered to the control circuit 10. The control circuit 10 controls a high-frequency inverter 11 that drives the magnetic field generator 4 based on a signal from the temperature detection element 9. The control circuit 10 controls the high-frequency inverter 11 such that the surface temperature of the fixing film 1 is maintained at a predetermined target temperature suited for fixing the image.

The high-frequency inverter 11 feeds a switching current having a frequency and amplitude based on a control signal of the control circuit 10 to a coil of the magnetic field generator 4 via feed contacts not shown. An induced current, i.e., a circulating current that circulates the fixing film 1 in a rotating direction, is caused to flow in a heat generating layer, i.e., conductive layer, of the fixing film 1 in accordance with the alternating magnetic field generated by the magnetic field generator 4, and the fixing film 1 generates heat.

During fixing of image, i.e., during image forming operation, the pressing roller 8 is driven to rotate by a drive source M. The fixing film 1 is rotated along with the rotation of the pressing roller 8 by frictional force received from the pressing roller 8 at the fixing nip N. In a state where the recording material P bearing an unfixed toner image T (FIG. 2) is conveyed to the fixing unit 200, the fixing unit 200 nips and conveys the recording material P between the fixing film 1 and the pressing roller 8 at the fixing nip N. Simultaneously, the fixing unit 200 heats the unfixed toner image T on the recording material P by the fixing film 1 being heated through induction heating. Thereby, the unfixed toner image T is melted, and an image fixed to the recording material P is obtained.

Preferably, the magnetic core 2 of the magnetic field generator 4 is formed of a material having a high saturation magnetic flux density at approximately 150° C. to 200° C., a small hysteresis loss, and a high relative permeability. The magnetic core 2 is a ferromagnetic body composed of an oxide or alloy material having a high permeability, for example. Examples of the oxide or alloy material having a high permeability include sintered ferrite, ferrite resin, and amorphous alloy, or permalloy.

High-Frequency Inverter

Figure 4:
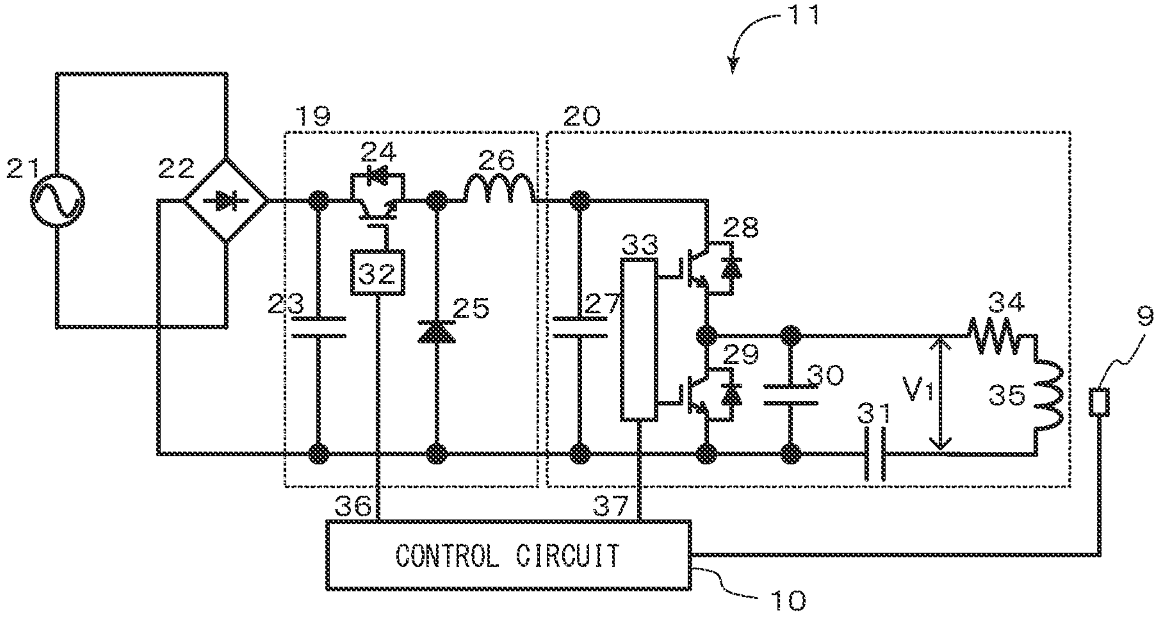
FIG. 4 is a circuit diagram of the fixing unit according to the first embodiment.

FIG. 4 is a circuit configuration diagram of the high-frequency inverter 11 serving as a coil drive circuit that supplies alternating current to the energizing coil 3. In FIG. 4, the fixing film 1 and the magnetic field generator 4 are replaced with a resistance 34 and an inductance 35 as an equivalent circuit.

The high-frequency inverter 11 receives power supply from a commercial AC power supply 21 via a diode bridge 22 serving as a rectifier circuit. The high-frequency inverter 11 includes a step-down converter circuit 19 and a half-bridge inverter circuit 20, i.e., current resonance circuit.

The step-down converter circuit 19 includes a capacitor 23, a switching element 24, a driving circuit 32, i.e., first driving circuit, a diode 25, and an inductance 26. The control circuit 10 can control an output voltage of the step-down converter circuit 19, i.e., input voltage to the half-bridge inverter circuit 20, via the driving circuit 32 that performs on/off control of the switching element 24.

The half-bridge inverter circuit 20 includes capacitors 27, 30, and 31, switching elements 28 and 29, a driving circuit 33, i.e., second driving circuit, the resistance 34, and the inductance 35. The control circuit 10 can control an operation frequency of the half-bridge inverter circuit 20 by the driving circuit 33 that performs an on/off control of the switching elements 28 and 29.

An AC voltage entered from the commercial AC power supply 21 is rectified at the diode bridge 22 and entered to the step-down converter circuit 19. A signal from the temperature detection element 9, i.e., temperature detection signal, is entered to the control circuit 10, and a pulse width modulation (PWM) signal 36 having a duty that is controlled corresponding to the temperature detection signal of the control circuit 10 is output to the step-down converter circuit 19. The step-down converter circuit 19 controls a voltage amplitude according to the duty-controlled PWM signal 36, and the controlled voltage is entered to the half-bridge inverter circuit 20. The half-bridge inverter circuit 20 receives a switching signal 37 for alternately switching the opening and closing of the switching elements 28 and 29 from the control circuit 10. The switching signal 37 is driven by an approximately equivalent frequency as a resonance frequency of a series resonance circuit that is composed of the capacitor 31 and the inductance 35. An alternating voltage V1 of a predetermined frequency is entered to feed contacts not shown of the energizing coil 3 by the switching signal 37.

Now, in a state where an effective voltage of the commercial AC power supply 21 is represented by Vac_rms (V), an effective voltage of the alternating voltage V1 is represented by V1_rms (V), and a duty of the PWM signal 36 is represented by Dpwm, the following relationship is satisfied.

$$\text{V1\_rms} = \frac{\sqrt{2}}{\pi}\text{Vac\_rms} \times Dpwm \qquad \text{Expression 1}$$

The circuit configuration of the high-frequency inverter 11 described above is merely an example, and the circuit configuration for generating the alternating voltage for driving the magnetic field generator 4 and a control system thereof may be replaced with a known circuit configuration.

Magnetic Field Generator and Heating Principle

Figure 5A:
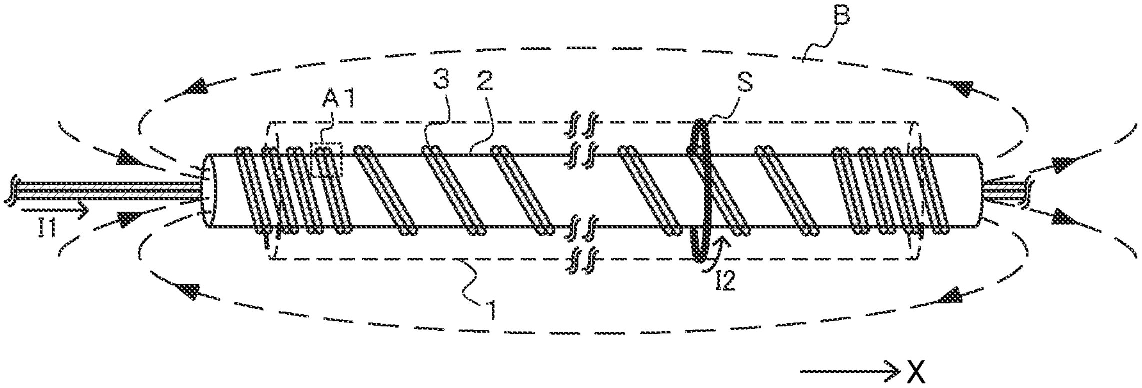
FIGS. 5A and 5B are each an explanatory view of a magnetic field generator according to the first embodiment.

A configuration of the magnetic field generator 4 serving as a magnetic field generating unit according to the present embodiment and the heating principle thereof will be described with reference to FIGS. 5A and 5B. FIG. 5A is a schematic drawing of the magnetic field generator 4. The magnetic core 2 is a single rod-shaped, or cylinder-shaped, ferrite core that extends in the longitudinal direction X, for example. As illustrated in the drawing, the energizing coil 3 is wound around the circumference of the magnetic core 2 helically from one end of the magnetic core 2 in the longitudinal direction X toward the other end. That is, the energizing coil 3 is formed helically that extends in a generating line direction of the fixing film 1 while winding in a circumferential direction of the fixing film 1 on an outer circumference side of the magnetic core 2. In other words, the energizing coil 3 is helically wound around the circumference of the magnetic core 2 so that its helical axis is oriented in the longitudinal direction of the fixing film 1.

The energizing coil 3 may include a plurality of windings that are arranged to run parallelly. In the present embodiment, two windings 3*a* and 3*b* are arranged to run parallelly. That is, if one of the windings is denoted as a first winding 3*a* and the other winding is denoted as a second winding 3*b*, the second winding 3*b* is wound around along the first winding 3*a*. The first winding 3*a* and the second winding 3*b* are each formed helically, and are approximately arranged parallel to each other. Further, the first winding 3*a* and the second winding 3*b* are connected in parallel with the high-frequency inverter 11, and each winding receives application of the above-mentioned alternating voltage V1.

As described, the energizing coil 3 adopting a configuration in which a plurality of windings 3*a* and 3*b* are running parallelly has the following advantages. That is, according to the fixing unit of the induction heating system, a relatively large current is supplied to the energizing coil to ensure a heating value. Therefore, if the energizing coil is composed of a single winding, a winding having a thick core wire will be used, considering the rated current, or allowable current. In contrast, by utilizing an energizing coil in which a plurality of windings are running parallelly, the current flown through each winding can be reduced, such that a winding having a thinner core wire can be used. Thereby, the magnetic field generator 4 can be configured in a more compact manner, which is advantageous in that the circumferential length of the fixing film 1 can be made shorter and the cross-sectional area in the short direction of the fixing unit can be reduced.

The number of windings constituting the energizing coil 3 is not limited, and as described below with reference to the fourth embodiment (FIG. 12), the energizing coil 3 may be composed of a single winding, i.e., the only one winding. If the energizing coil 3 is composed of a plurality of windings, the number of windings may preferably be two to four windings that run parallelly, considering the pitch of the windings. Further, from the viewpoint of avoiding the increase in size of a connecting configuration with a high-frequency inverter, especially, the increase in the number of connector pins or the connector size, a preferable number of windings is two.

According further to the present embodiment, the first winding 3*a* and the second winding 3*b* are substantially wound in the same area in the longitudinal direction X, but a configuration can be adopted in which the first winding 3*a* and the second winding 3*b* are wound in different areas. Further, a configuration can be adopted in which the alternating voltages applied to the first winding 3*a* and the second winding 3*b* are controlled independently.

A switching current corresponding to the alternating voltage V1 generated at the high-frequency inverter 11 is flown to the energizing coil 3. FIG. 5A illustrates a state at a certain point of time, that is, at a moment at which a current flowing from one side in the longitudinal direction X toward the other side (arrow 11) increases. In this state, in response to the increase of the current flowing through the energizing coil 3, a magnetic field B directed from one side in the longitudinal direction X of the magnetic core 2 inside the energizing coil 3 toward the other side and directed to return on the outer side of the energizing coil 3 toward the opposite side in the longitudinal direction X is generated. The magnetic field B can be illustrated by a line of magnetic force that is directed within the space on the inner side of the fixing film 1 toward a first direction of the rotational axis direction, i.e., longitudinal direction X of the fixing film and mainly returning through a space on the outer side of the fixing film toward a second direction opposite to the first direction.

In FIG. 5A, a part of the fixing film 1 is illustrated in schematic diagram as an annular circuit S. A heat generating principle of the fixing film 1 follows the Faraday's law. The Faraday's law can be defined as follows: when a magnetic field within a circuit S is varied, an induced electromotive force directed to flow a current through the circuit is generated, and the induced electromotive force is proportional to a time change of magnetic flux that vertically penetrates the circuit.

Assume that a circuit S is positioned at a center portion in the longitudinal direction X of the magnetic core 2 illustrated in FIG. 5A, and a switching current is flown to the energizing coil 3. An alternating magnetic field having a line of magnetic force that passes through the inner side of the magnetic core 2 is formed by flowing the switching current. In this state, the induced electromotive force generated in the circuit S is proportional to the time change of a magnetic flux Φ that vertically penetrates the circuit, according to the following expression.

$$V = -N\frac{\Delta\Phi}{\Delta t} \qquad \text{Expression 2}$$

wherein, V represents an induced electromotive force, N represents a number of turns of coil, and $\Delta\Phi/\Delta t$ represents a change of magnetic flux that vertically penetrates the circuit in an infinitesimal time $\Delta t$.

Since a circulating current, i.e., induced current, I2 directed in a direction to cancel out the magnetic field B flows in the fixing film 1 by this induced electromotive force V, the fixing film 1 is heated by Joule heat. Each time the direction of the switching current is reversed, the direction of the magnetic field B is also reversed, and the direction of the induced current flowing in the fixing film 1 is also reversed.

As described, by supplying a switching current to the energizing coil 3, the magnetic field generator 4 functions as a magnetic field generating unit that generates an alternating magnetic field to induce an induced current and causing the fixing film 1 to heat itself. Further, the magnetic core 2 functions as a member that induces a magnetic flux, i.e., line of magnetic force, of the magnetic field generated by the energizing coil 3 and forms a magnetic path, i.e., magnetic path forming member.

Figure 5B:
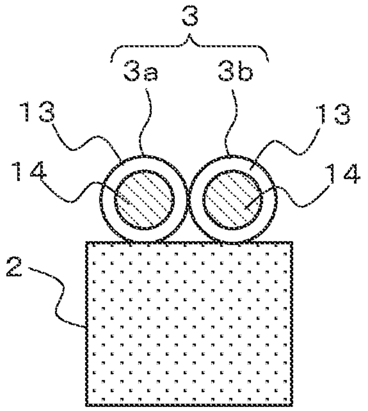

FIG. 5B is a cross-sectional view of an area A1 denoted by dotted lines in FIG. 5A. The first winding 3*a* and the second winding 3*b* constituting the energizing coil 3 includes a conductor 14 formed of a copper wire, for example, and an insulating coating 13 that covers a circumference of the conductor 14. A fluororesin such as polytetrafluoroethylene (PTFE) can be utilized suitably as the insulating coating 13. In the present embodiment, the influence of the proximity effect is relieved, as described below, by ensuring a distance between conductors of the energizing coil 3 and the distance between the conductor of the energizing coil 3 and the magnetic core 2 through the insulating coating 13 serving as a resin layer having an insulating property.

Since the insulating coating 13 such as the one according to the present embodiment has elasticity, in a state where the energizing coil 3 is wound around the magnetic core 2, the insulating coating 13 also provides an advantage in that it serves as a shock absorber to reduce the pressure loaded to the magnetic core 2.

The conductor 14 according to the present embodiment is a solid copper wire, but it may also be formed of materials other than copper, or it may also be a stranded wire. For example, it may be a stranded wire composed of a nickel-plating annealed copper wire.

Relationship between Magnetic Core Temperature and Magnetic Saturation

Figure 6:
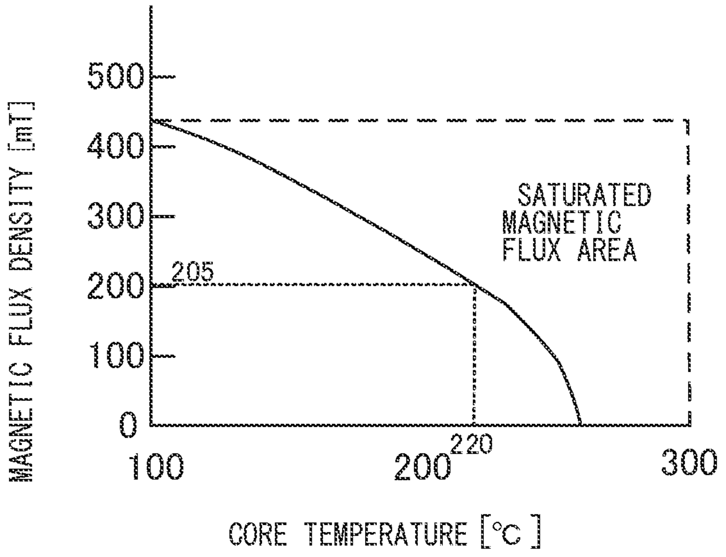
FIG. 6 is a graph illustrating a relationship between a magnetic core temperature and a magnetic flux density.

FIG. 6 is a graph illustrating a relationship between temperature of the magnetic core 2, i.e., core temperature, and a magnetic flux density. The saturated magnetic flux area in the drawing illustrates a relationship between the magnetic flux density and core temperature in a state where the magnetic core 2 reaches magnetic saturation. When the magnetic core 2 reaches magnetic saturation, the magnetic permeability of the magnetic core 2 will be extremely small, such that a large current may flow to the energizing coil 3, which may cause circuit failure. Therefore, it is preferable to use the magnetic core 2 in an area other than the saturated magnetic flux area. The present embodiment assumes the magnetic flux density of the magnetic core 2 as being 205 mT, and in that case, a maximum core temperature that does not cause magnetic saturation is 220° C. In other words, the fixing unit according to the present embodiment is preferably used according to a condition in which the temperature of the magnetic core 2 does not exceed 220° C., which is a temperature set in advance.

Figure 7:
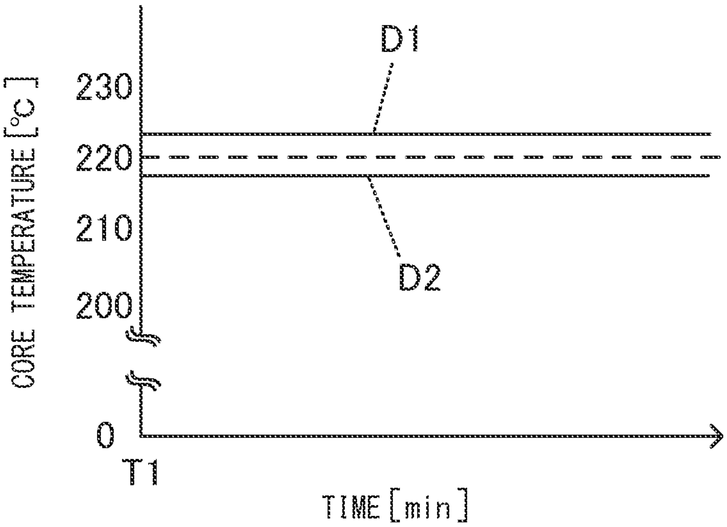
FIG. 7 is a graph illustrating a relationship between a continuous printing time and the magnetic core temperature.

FIG. 7 illustrates a relationship between a core temperature and an elapsed time during which the image forming apparatus 100 performs an image forming operation continuously to a plurality of recording materials, i.e., continuous printing. Core heated temperatures D1 and D2 are each a core temperature at which heat saturation has occurred by elapse of a sufficient continuous printing time T1.

During continuous printing, the core temperature gradually rises, and when a quantity of heat supplied to the magnetic core 2 from an external heat source and a quantity of heat emitted from the magnetic core 2 are balanced, or heat is saturated, the core temperature will become approximately constant. The heat source includes not only the fixing film 1 that generates heat by induced current but also the energizing coil 3 that is self-heated, or experiences self-temperature rise, by Joule heat during power supply from an alternating current.

A core heated temperature D1 corresponds to a case where the self-temperature rise of the energizing coil 3 is great, and in that case, the temperature at which the magnetic core 2 reaches heat saturation (D1) was 222° C. Therefore, it may be possible that, during continuous printing, the temperature of the magnetic core 2 may exceed 220° C. Therefore, when executing continuous printing, it may be possible to prevent circuit failure by reducing printing speed, i.e., throughput, before the core temperature exceeds 220° C., but such measures will deteriorate the productivity of the image forming apparatus.

Meanwhile, a core heated temperature D2 corresponds to a case where the self-temperature rise of the energizing coil 3 is small. In that case, the temperature at which the magnetic core 2 reaches heat saturation (D2) was 218° C. Therefore, even if the continuous printing is continued in that state, the temperature of the magnetic core 2 will not exceed 220° C., and the productivity of the image forming apparatus will be maintained.

As described, by suppressing magnetic saturation of the magnetic core 2 which may lead to deterioration of productivity of the image forming apparatus, it is desirable to reduce the rising in temperature of the magnetic core 2, and it is therefore desirable to reduce self-heating of the energizing coil 3, which is one of the causes of the rise in temperature of the magnetic core 2.

Further, in a case where the self-heating of the energizing coil 3 is great, there may be risks of limitation of the material of the windings constituting the energizing coil 3 to increase the heat resistance temperature of the winding, or increase of energy consumption of the fixing unit caused by the increase of electric resistance of the winding. Even from these points of view, it is desirable to reduce self-heating of the energizing coil 3.

Proximity Effect

Next, a distance L1 between adjacent conductors of the energizing coil 3 and a distance L2 between the energizing coil 3 and the magnetic core 2 will be described.

At first, the distance L1 between adjacent conductors of the energizing coil 3 and a proximity effect thereof will be described. The distance L1 is a distance, in a plane along a longitudinal direction of a rotary member included in the fixing unit, between a first cross section of the conductor of the energizing coil, such as a conductor 14*a* illustrated in FIG. 8A, and a second cross section of the conductor arranged adjacent to the first cross section in the longitudinal direction, such as a conductor 14*b* illustrated in FIG. 8A. In a case where the energizing coil 3 (FIGS. 5A and 5B) including the first winding 3*a* and the second winding 3*b* running parallelly with each other is used, the first cross section is a cross section of the first winding 3*a*, and the second cross section is a cross section of the second winding 3*b*. In a case where the energizing coil 3 composed of a single winding 3 (FIG. 12) is used, as described in a fourth embodiment described below, the second cross section is a cross section of the winding 3 at a position where the winding 3 has been wound once around the magnetic core 2 from the first cross section.

Figure 8A:
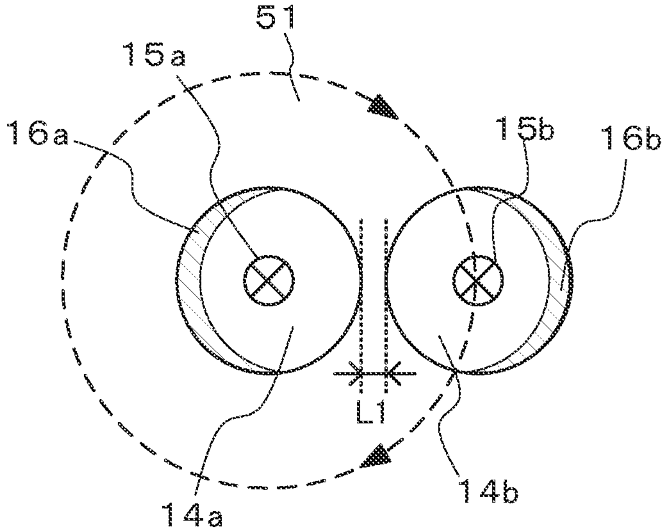
FIG. 8A is a schematic diagram illustrating a proximity effect between conductors of an energizing coil and FIG. 8B is a graph illustrating the proximity effect.

FIG. 8A is a schematic diagram that describes a proximity effect in a state where two conductors 14*a* and 14*b* that are running parallelly are approximated. This drawing illustrates a moment at which currents 15*a* and 15*b* that are directed from a front side toward a depth side are flown through each of the conductors 14*a* and 14*b*. For sake of description, only a magnetic flux 51 of the magnetic field generated in the conductor 14*a* is illustrated, and the magnetic flux of the conductor 14*b* is not shown. The distance L1 (mm) between the conductors 14*a* and 14*b* is extremely small.

Figure 8B:
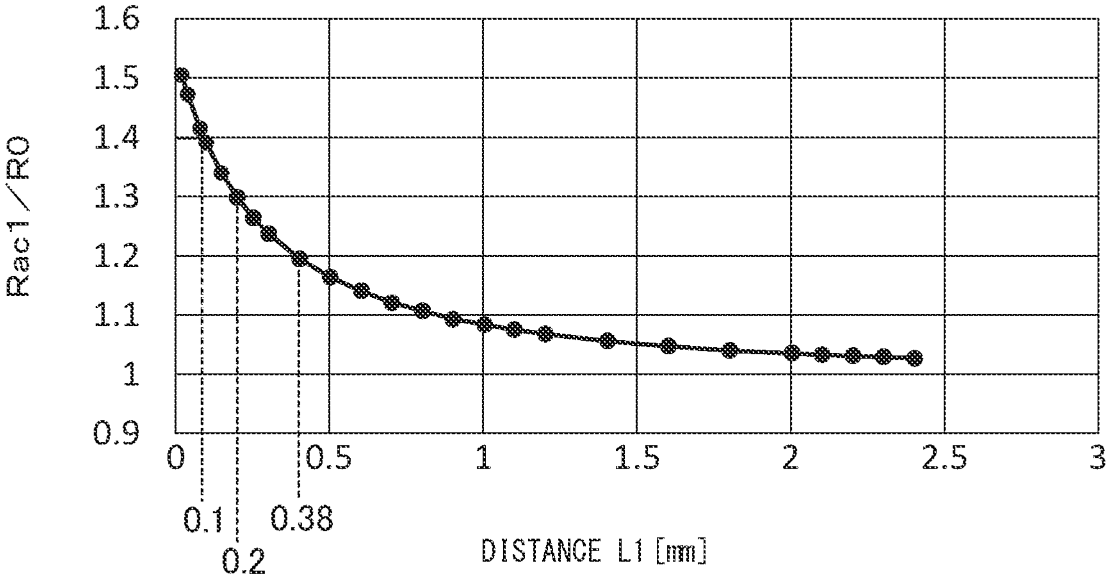

In a state where a switching current is flown through the conductors 14*a* and 14*b*, a magnetic field is generated in the circumference of each of the conductors 14*a* and 14*b*. Since the conductor 14*b* is influenced by the magnetic field generated by the conductor 14*a* approximated thereto, a magnetic field is generated so as to cancel out the magnetic flux 51. As a result, a proximity effect occurs, and most of the current is flown only through an area 16*b* in the conductor 14*b* at a side far from the conductor 14*a*. Similarly, the conductor 14*a* is influenced by the magnetic field generated by the conductor 14*b*, and most of the current is flown only through an area 16*a* in the conductor 14*a* at a side far from the conductor 14*b*. As a result, a resistance value of the energizing coil 3 is increased, power loss, i.e., copper loss, is increased, and the self-temperature rise of the energizing coil 3 is increased. FIG. 8B illustrates a relationship of resistance value change rate Rac1/R0 with respect to the distance L1 between conductors illustrated in FIG. 8A. R0 is a resistance value of the conductors 14*a* and 14*b* including a skin effect in a state where there is no influence of proximity effect when a switching current is flown through the conductor. Rac1 is a resistance value of the conductors 14*a* and 14*b* including the proximity effect. FIG. 8B is a result of calculation performed based on a calculation formula disclosed in the following document, assuming that a diameter of the conductors 14*a* and 14*b* is 1.0 mm, a frequency of the switching current is 100 kHz, and a radius of the magnetic core 2 is 5 mm.

(Reference Document) H. B. Dwight, —Proximity Effect in Wires and Thin Tubes Tras. A.I.E.E., 1923, p 850-859

As illustrated in FIG. 8B, if the distance L1 (mm) between conductors of the energizing coil 3 is L1=0.02, the resistance value change rate Rac1/R0 will be approximately 1.5. That is, in a case where an interval of adjacent conductors is 0.02 mm, the resistance value of the energizing coil 3 is increased significantly by the proximity effect. Meanwhile, as the length of the distance L1 increases, the resistance value change rate Rac1/R0 is gradually decreased and approaches 1.

Figure 9A:
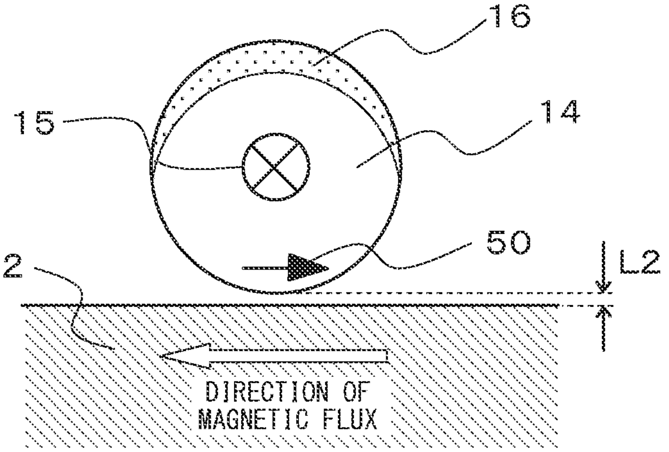
FIG. 9A is a schematic diagram illustrating the proximity effect between the energizing coil and the magnetic core and FIG. 9B is a graph illustrating the proximity effect between the energizing coil and the magnetic core.

Next, the distance L2 between the energizing coil 3 and the magnetic core 2 and the proximity effect thereof will be described. The distance L2 is a distance between the conductor 14 of the energizing coil 3 and the magnetic core 2 in a radial direction orthogonal to the helical axis of the energizing coil 3. FIG. 9A is a schematic diagram illustrating a proximity effect in a state where the magnetic core 2 and the energizing coil 3 are approximated. This drawing illustrates a moment in which a current 15 directed from a front side toward a depth side is flown through the conductor 14. It is assumed that the distance L2 (mm) between the conductor 14 and the magnetic core 2 is extremely small.

In a state where a switching current is flown through the conductor 14, a magnetic flux is generated in the magnetic core 2 in a direction of the arrow. The conductor 14 is greatly influenced by the magnetic field of the magnetic core 2, and a magnetic flux 50 is generated in a direction to cancel out the magnetic flux. As a result, a proximity effect is generated, and most of the current is flown only through an area 16 at a side far from the magnetic core 2 of the conductor 14. Thereby, a resistance value of the energizing coil 3 is increased, power loss, i.e., copper loss, is increased, and self-temperature rise of the energizing coil 3 is increased.

Figure 9B:
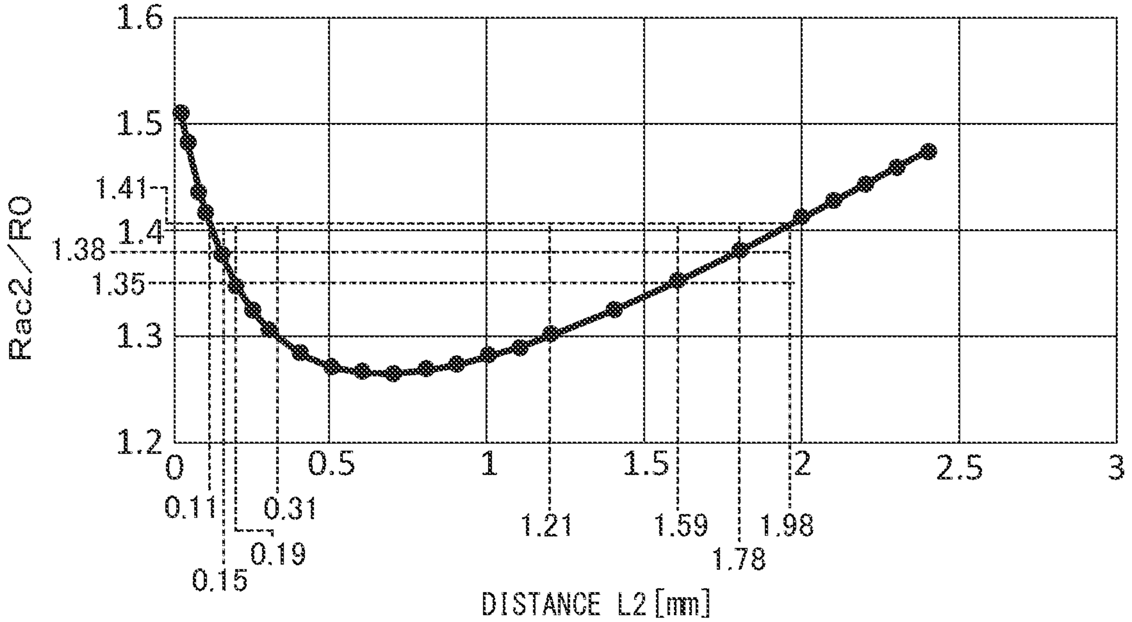

FIG. 9B illustrates a relationship between a resistance value change rate Rac2/R0 and the distance L2 between the energizing coil 3 and the magnetic core 2 illustrated in FIG. 9A. The diameter of the conductor 14, the frequency of the switching current, and the radius of the magnetic core 2 are the same as the conditions calculated in FIG. 8B.

As illustrated in FIG. 9B, regarding the distance L2 (mm) between the conductor 14 of the energizing coil 3 and the magnetic core 2, in a case where L2=0.02, the resistance value change rate Rac2/R0 was approximately 1.5 times. That is, in a case where the distance between the energizing coil 3 and the magnetic core 2 is 0.02 mm, the resistance value of the energizing coil 3 is greatly increased by the proximity effect.

Within the range of L2<0.7, the resistance value change rate Rac2/R0 reduces as the distance L2 increases. However, in the range of L2>0.7, the resistance value change rate Rac2/R0 increases as the distance L2 extends. This is because a circumference length of the winding extends as the value of L2 increases since the energizing coil 3 is wound around the magnetic core 2 at an area separated by distance L2 from the outer circumference surface of the magnetic core 2, and a resistance value (Rac2) increases according to the total length of the winding. That is, in the range of L2<0.7, the influence of reduction of proximity effect exceeds the influence of increase of circumference length of the winding, such that the resistance value change rate Rac2/R0 is reduced, whereas in the range of L2>0.7, the latter exceeds the former and the resistance value change rate Rac2/R0 is increased.

As described above, the resistance value of the energizing coil 3 changes according to the distances L1 and L2. In the fixing unit of the present embodiment, the energizing coil 3 is configured to satisfy the following inequalities of L1>0.1 and 0.1<L2<2.0.

In a state where the distance L1 between conductors of the energizing coil 3 is greater than 0.1 mm, the resistance value change rate Rac1/R0 of FIG. 8B was less than 1.4. Therefore, by making the distance L1 to satisfy an inequality of L1>0.1, the increase of resistance value of the energizing coil 3 by proximity effect between adjacent conductors can be suppressed, and the generation of heat during electric conduction of the energizing coil 3 in a proportional relationship with the resistance value can be reduced.

Further, in a state where the distance L2 between the conductor 14 of the energizing coil 3 and the magnetic core 2 is within the range of 0.11 mm mm) to 1.98 mm (2.0 mm), the resistance value change rate Rac2/R0 of FIG. 9B was less than 1.41. Therefore, by making the distance L2 to satisfy an inequality of 0.1<L2<2.0, the increase of resistance value of the energizing coil 3 by proximity effect between the energizing coil 3 and the magnetic core 2 can be suppressed, and the generation of heat during electric conduction of the energizing coil 3 in a proportional relationship with the resistance value can be reduced.

Now, in a state where the resistance value change rate Rac1/R0=1.5 or Rac2/R0=1.5, the heat saturation temperature of the magnetic core 2 during continuous printing will be the core heated temperature D1 (>220° C.) of FIG. 7. In this state, the self-temperature rise of the energizing coil 3 is set to 50° C. By setting L1 and L2 as described above, the increase of resistance value of the energizing coil 3 is reduced, and as a result of reduction of heat generation during electric conduction of the energizing coil 3, the heat saturation temperature of the magnetic core 2 will be the core heated temperature D2 (<220° C.) of FIG. 7.

As described, according to the present embodiment, a fixing unit capable of reducing heat generation during electric conduction of the energizing coil and an image forming apparatus equipped with such fixing unit can be provided.

Further, according to the result of FIG. 8B, when L1≥0.20, the resistance value change rate Rac1/R0 will be 1.3 or less, and further, when L1≥0.38, the resistance value change rate Rac1/R0 will be 1.2 or less. Therefore, by configuring the energizing coil 3 so that preferably L1≥0.20, or more preferably L1≥0.38, is satisfied, the increase of resistance value of the energizing coil 3 by proximity effect of conductors can be reduced further, and the heat generation during electric conduction of the energizing coil 3 can be reduced even further.

According to the result of FIG. 9B, when 0.15≤L2≤1.78, the resistance value change rate Rac2/R0 was 1.38 or less. Further, when 0.19≤L2≤1.59, the resistance value change rate Rac2/R0 was 1.35 or less. Even further, when 0.31≤L2≤1.21, the resistance value change rate Rac2/R0 was 1.30 or less. Therefore, the energizing coil 3 is configured such that preferably 0.15≤L2≤1.78, or more preferably 0.19≤L2≤1.59, is satisfied. Thereby, the increase of resistance value of the energizing coil 3 by proximity effect with the magnetic core 2 can be reduced further, and the heat generation during electric conduction of the energizing coil 3 can be reduced even further.

As an example, the above-mentioned distances L1 and L2 can be ensured by the thickness of the insulating coating 13 of the winding constituting the energizing coil 3. In that case, a winding with an insulating coating 13 having a thickness greater than 0.1 mm and less than 2.0 mm is used. Further, the first winding **3*a* and the second winding 3*b* are wound around the magnetic core 2 in a state where the insulating coatings 13 are in contact with one another (x=0 in FIG. 13A). Thereby, the aforementioned relationship of L1>0.1 and 0.1<L2<2.0 can be satisfied, and the self-temperature rise of the energizing coil can be suppressed. Further, a gap can be formed between the first winding 3*a* and the second winding 3*b* to ensure the distance L1. Even further, a resin layer can be provided on the outer circumference of the magnetic core 2 around which the energizing coil 3** is wound to ensure the distance L2.

In the above description, there is no upper limit set for the distance L1, but if the distance L1 is extremely great, the heating value of the fixing film 1 may become uneven in the longitudinal direction X. In the vicinity of both end portions in the longitudinal direction X of the fixing film 1, the magnetic field acting on the heat generating layer of the fixing film 1 may be relatively weak compared to the center portion in the longitudinal direction, according to which the heating value may be insufficient. As a countermeasure, the winding pitch in the vicinity of both end portions in the longitudinal direction of the energizing coil 3 may be shortened compared to the winding pitch at the center portion in the longitudinal direction thereof, but if the distance L1 is too long, the insufficient heating value at the end portions of the fixing film may not be compensated. Therefore, the distance L1 can be set so that harmful effects such as image defects caused by temperature unevenness of the fixing film 1 will not occur, according to the actual configuration such as the thermal conductivity of the fixing film 1.

Supplementation Regarding L1 and L2

The definition and measurement method of the distances L1 and L2 will be described as supplementation. The distance L1 between conductors of the energizing coil 3 indicates an average distance between adjacent conductors in the longitudinal direction X, that is, generating line direction of the fixing film 1, in the range in which the energizing coil 3 is wound around the magnetic core 2.

In the present embodiment, since the energizing coil 3 is composed of the first winding 3*a* and the second winding 3*b* which run parallelly, the distance L1 corresponds to the average distance between the conductor 14 of the first winding 3*a* and the conductor 14 of the second winding 3*b*. However, as according to the fourth embodiment described below, “conductors arranged adjacently in the longitudinal direction X” may be a conductor of a single winding.

Figure 13A:
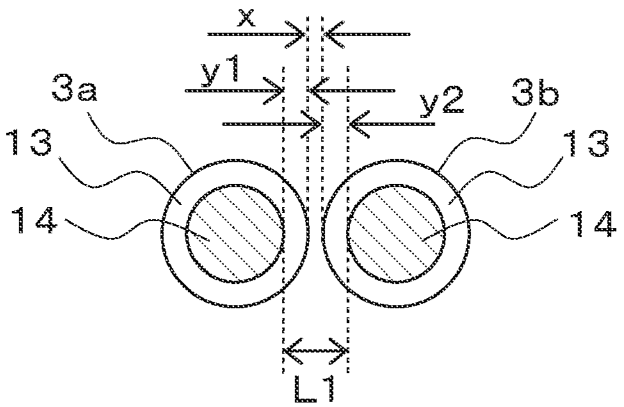
FIGS. 13A and 13B are each an explanatory view of distance L1 and distance L2.

A method for measuring the distance L1 will be described with reference to FIG. 13A. The method regarding the fourth embodiment will be described below. A distance between an outermost surface of the first winding 3*a* and an outermost surface of the second winding 3*b* is referred to as x, a thickness of the insulating coating 13 of the first winding 3*a* is referred to as y1, and a thickness of the insulating coating 13 of the second winding 3*b* is referred to as y2. The distance L1 between the conductors 14 is a sum of x and y1 and y2. For averaging, it is preferable to measure the distance x at multiple positions in the longitudinal direction X, and to set an average value of the sum of x and y1 and y2 as the distance L1. Further, in a case where multiple layers of insulating coating are applied, as in the case of a litz wire subjected to sheath processing, y1 and y2 are each a distance from the outermost portion of the conductor to the outermost surface of the winding, that is, a total of the thicknesses of the respective insulating layers.

The distance L2 between the conductor of the energizing coil 3 and the magnetic core 2 refers to an average distance from the outermost surface of the magnetic core 2 to the conductor of the energizing coil 3 within the area in which the energizing coil 3 is wound around the magnetic core 2.

Figure 13B:
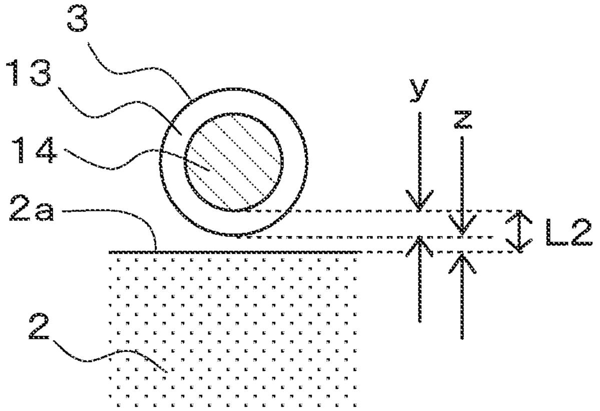

A method for measuring the distance L2 will be described with reference to FIG. 13B. A distance between the outermost surface of the winding of the energizing coil 3 and an outer circumference surface 2*a* of the magnetic core 2 is referred to as z, and a thickness of the insulating coating 13 of the winding is referred to as y. The distance L2 between the conductor of the energizing coil 3 and the magnetic core 2 is a sum of z and y.

According to the present embodiment, the energizing coil 3 is directly wound around an outer circumference surface of the magnetic core 2. Therefore, the distance L2 is equivalent to a thickness y of the insulating coating 13 of the winding constituting the energizing coil 3. Since the elastic deformation of the insulating coating 13 by coming into contact with the magnetic core 2 is small, it is ignored when calculating the distance L2.

Modified Example

In the first embodiment, an example in which a PTFE is used as the insulating coating 13 has been described, but other materials can also be used as the insulating coating 13, and for example, a fluororesin having superior heat-resisting property, such as perfluoro alkoxyalkane (PFA), may be used.

Second Embodiment

A configuration according to a second embodiment will be described. Elements denoted with the same reference numbers as the first embodiment have approximately a similar configuration and function as those described in the first embodiment, such that only the parts that differ from the first embodiment will mainly be described.

Figure 10A:
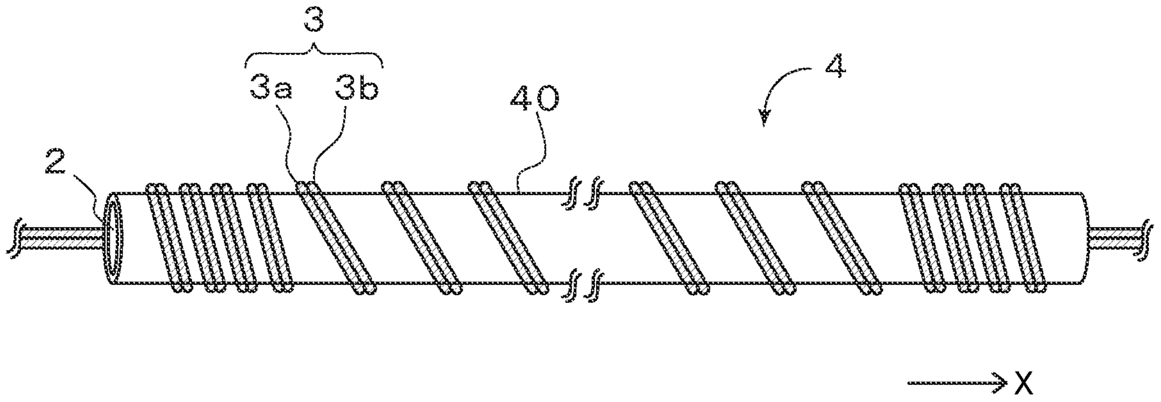
FIGS. 10A and 10B are each an explanatory view of a magnetic field generator according to a second embodiment.
Figure 10B:
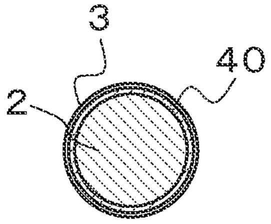

FIG. 10A is a schematic drawing illustrating the magnetic field generator 4 serving as a magnetic field generating unit according to the second embodiment, and FIG. 10B is a cross-sectional view thereof. In the present embodiment, the magnetic core 2 is inserted to a tube 40 formed of resin having an insulating property, and the energizing coil 3 is wound around the outer circumference of the tube 40. The tube 40 is formed, for example, of polyphenylene sulfide (PPS). The energizing coil 3 can use a PTFE line similar to the first embodiment as the winding. Further, the energizing coil 3 can be configured such that the first winding 3*a* and the second winding 3*b* are running parallelly adjacent to each other in the longitudinal direction X.

A thickness w1 of insulating coating of the first winding 3*a* and the second winding 3*b* is set to 0.2 mm, for example. Further, a thickness w2 of the tube 40 is set to 0.5 mm, for example. In this case, if the first winding 3*a* and the second winding 3*b* are wound around the magnetic core 2 in a state in contact with each other, the distance L1 between conductors of the energizing coil 3 will be 0.4 mm (x=0, y1=y2=0.2 in FIG. 13A). Further, the distance L2 between the conductor of the energizing coil 3 and the magnetic core 2 will be 0.7 mm (z=0.5, y=0.2 in FIG. 13B), since the tube 40 is interposed between the outer circumference surface of the winding and the outer circumference surface of the magnetic core 2. Thereby, $L1>0.1$ and $0.1<L2<2.0$ can be satisfied.

Therefore, even according to the configuration of the present embodiment, the influence of the proximity effect can be reduced, such that a fixing unit capable of reducing the heat generation during electric conduction of the energizing coil and an image forming apparatus equipped with such fixing unit can be provided.

As according to the present embodiment in which the energizing coil 3 is wound around the tube 40 being fit to the exterior of the magnetic core 2, the insulating coating 13 of the energizing coil 3 and the tube 40 each function as the resin layer having an insulating property for ensuring the distances L1 and L2.

Third Embodiment

A configuration according to a third embodiment will be described. Elements denoted with the same reference numbers as the first embodiment have approximately a similar configuration and function as those described in the first embodiment, such that only the parts that differ from the first embodiment will mainly be described.

Figure 11A:
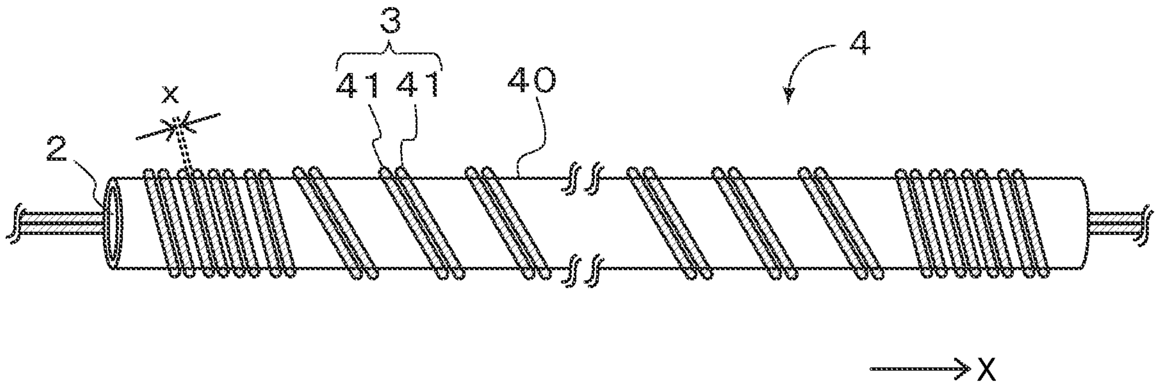
FIGS. 11A and 11B are each an explanatory view of a magnetic field generator according to a third embodiment.
Figure 11B:
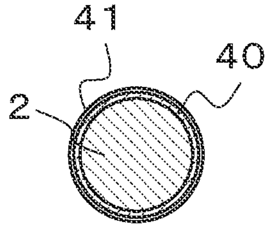

FIG. 11A is a schematic drawing illustrating the magnetic field generator 4 serving as a magnetic field generating unit according to a third embodiment, and FIG. 11B is a cross-sectional view thereof. In the present embodiment, an enameled wire 41 is used as the winding instead of the P line according to the first embodiment, and the energizing coil 3 is wound around the outer circumference of the tube 40 similar to the second embodiment. The tube 40 is formed, for example, of PPS. Further, the energizing coil 3 is configured such that two enameled wires 41 are running parallelly adjacent to each other in the longitudinal direction X.

A thickness w2 of the tube 40 is set to 0.5 mm, for example. Further, the distance x between two enameled wires 41 running parallelly is set to 0.5 mm, for example, using a dedicated coil winding tool. In this case, since a thickness of an insulating coating of the enameled wire 41 is small, the distance L1 between conductors of the energizing coil 3 will be 0.5 mm ($x=0.5$, $y1=y2\approx 0$ in FIG. 13A). Further, the distance L2 between the conductor of the energizing coil 3 and the magnetic core 2 is set to 0.5 mm ($z=0.5$, $y\approx 0$ in FIG. 13B), which is the thickness of the tube 40. Thereby, $L1>0.1$ and $0.1<L2<2.0$ can be satisfied.

Therefore, even according to the present embodiment, the influence of the proximity effect can be reduced, such that a fixing unit capable of reducing the heat generation during electric conduction of the energizing coil and an image forming apparatus equipped with such fixing unit can be provided.

Fourth Embodiment

A configuration according to a fourth embodiment will be described. Elements denoted with the same reference numbers as the first embodiment have approximately a similar configuration and function as those described in the first embodiment, such that only the parts that differ from the first embodiment will mainly be described.

Figure 12:
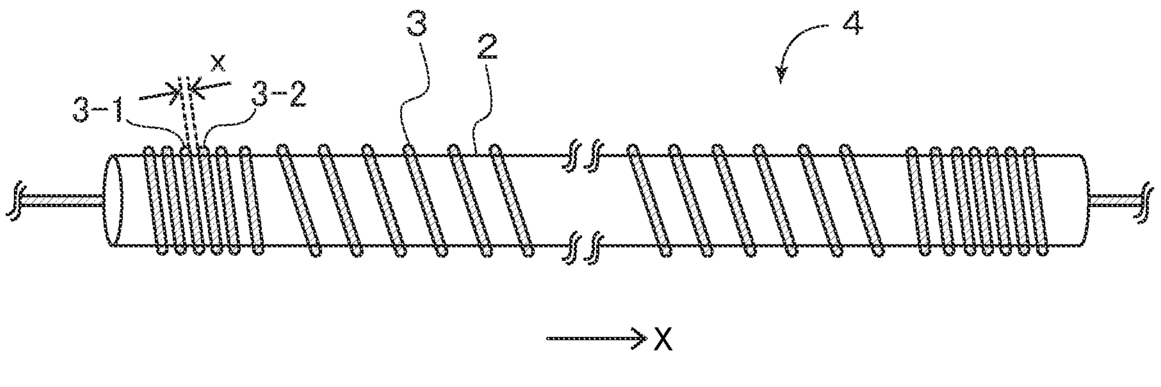
FIG. 12 is an explanatory view of a magnetic field generator according to a fourth embodiment.

FIG. 12 is a schematic drawing illustrating the magnetic field generator 4 serving as a magnetic field generating unit according to the fourth embodiment. The energizing coil 3 according to the present embodiment is composed of a single winding. In this case, the distance L1 between conductors of the energizing coil 3 is calculated based on a distance x between conductors positioned adjacent to each other in the longitudinal direction X of the same single winding. The distance x is the distance between an outer circumference surface of a first part 3-1, which is a part of the winding of the energizing coil 3, and an outer circumference surface of a second part 3-2 of the energizing coil 3 that has been wound once around the circumference of the magnetic core 2 from the first part 3-1 and that is arranged adjacent to the first part 3-1 in the longitudinal direction X. Further, in a state where the winding includes an insulating coating, the value obtained by denoting the thicknesses of the insulating coating of the first part 3-1 and the second part 3-2 as y1 and y2 of FIG. 13A and adding the same to the distance x will be the distance L1.

Further, in a state where the winding pitch of the energizing coil 3 is not constant in the longitudinal direction X, as illustrated in FIG. 12, the distance L1 calculated by setting the area where the winding pitch is shortest as reference to satisfy $L1>0.1$, by which the influence of the proximity effect can be reduced even more reliably.

Even according to the configuration of the present embodiment, by adopting a configuration that satisfies $L1>0.1$ and $0.1<L2<2.0$, the influence of the proximity effect can be reduced, such that a fixing unit capable of reducing the heat generation during electric conduction of the energizing coil and an image forming apparatus equipped with such fixing unit can be provided.

Other Modifications

The fixing unit, or image heating apparatus, includes an apparatus that applies glossiness to the image by utilizing the principle of heat fixing, or that bonds, i.e., pressure-bonds, sheets using melted toner.

As described, according to the present disclosure, a fixing unit capable of reducing heat generation during electric conduction of the energizing coil and an image forming apparatus equipped with the same can be provided.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-150320, filed on Sep. 21, 2022, which is hereby incorporated by reference herein in its entirety.

What is claimed is:

1. A fixing unit comprising:

a rotary member that includes a conductive layer and that is formed in a tubular shape extending in a longitudinal direction of the rotary member;

a magnetic core inserted in an interior space of the rotary member; and an energizing coil that includes a conductor and that is wound helically around a circumference of the magnetic core such that a helical axis of the energizing coil is oriented in the longitudinal direction, the energizing coil being configured to generate an alternating magnetic field that induces a current in the conductive layer in a case where an alternating current is passed through the conductor of the energizing coil, wherein the conductive layer is configured to generate heat by the current induced in the conductive layer, and wherein, in a case where a distance between a first cross section of the conductor of the energizing coil in a plane along the longitudinal direction and a second cross section of the conductor of the energizing coil in the plane and adjacent to the first cross section in the longitudinal direction is L1 (mm), and a distance between the conductor of the energizing coil and the magnetic core in a radial direction orthogonal to the helical axis is L2 (mm), following inequalities are satisfied, $$L1>0.1 \text{ and } 0.1<L2<2.0.$$

2. The fixing unit according to claim 1, wherein the energizing coil includes a first winding wound helically around the magnetic core and a second winding wound helically around the magnetic core along the first winding, and wherein the first cross section is a cross section of the first winding, and the second cross section is a cross section of the second winding.

3. The fixing unit according to claim 1, wherein the energizing coil has only one winding, and wherein the second cross section is a cross section of the winding at a position at which the winding is wound once around the magnetic core from the first cross section.

4. The fixing unit according to claim 1, further comprising:

a resin layer having an insulating property, the resin layer being provided between the first cross section and the second cross section of the conductor and between the conductor and an outer circumference surface of the magnetic core.

5. The fixing unit according to claim 4, wherein the resin layer includes an insulating coating that covers the conductor.

6. The fixing unit according to claim 5, wherein the energizing coil is wound around the outer circumference surface of the magnetic core, and wherein a thickness of the insulating coating is greater than 0.1 mm and less than 2.0 mm.

7. The fixing unit according to claim 5, wherein the energizing coil includes a first winding and a second winding, each including the conductor and the insulating coating, and wherein the first winding and the second winding are wound around the magnetic core in a state where the insulating coating of the first winding is in contact with the insulating coating of the second winding.

8. The fixing unit according to claim 4, wherein the resin layer is formed of fluororesin.

9. The fixing unit according to claim 4, wherein the resin layer includes a tube which is made of resin and in which the magnetic core is inserted, and wherein the energizing coil is wound around an outer circumference surface of the tube.

10. The fixing unit according to claim 1, wherein the distance L1 further satisfies an inequality of $L1 \geq 0.20$.

11. The fixing unit according to claim 1, wherein the distance L1 further satisfies an inequality of $L1 \geq 0.38$.

12. The fixing unit according to claim 1, wherein the distance L2 further satisfies an inequality of $0.15 \leq L2 \leq 1.78$.

13. The fixing unit according to claim 1, wherein the distance L2 further satisfies an inequality of $0.19 \leq L2 \leq 1.59$.

14. The fixing unit according to claim 1, further comprising:

a nip forming member arranged in an interior space of the rotary member which is a tubular film; and a pressing member that is in pressure contact with the nip forming member and sandwiches the film together with the nip forming member such that a nip portion is formed between the film and the pressing member, wherein the fixing unit is configured to nip and convey a recording material with the film and the pressing member at the nip portion while fixing an image on the recording material using the film heated by the current induced in the conductive layer.

15. An image forming apparatus comprising:

an image forming unit configured to form an image on a recording material; and the fixing unit according to claim 1 configured to fix the image to the recording material.

* * * * *